MAGNETIC RECORDING AND REPRODUCING

Filed June 27, 1944 2 Sheets-Sheet 1

INVENTOR.
A.L.W.WILLIAMS &
S. J. BEGUN
BY Pineles & Greene
Attorneys

May 22, 1951 A. L. W. WILLIAMS ET AL 2,554,354

MAGNETIC RECORDING AND REPRODUCING

Filed June 27, 1944 2 Sheets-Sheet 2

INVENTORS
A.L.W. WILLIAMS
S.J. BEGUN
BY Pineles + Greene
ATTORNEYS

Patented May 22, 1951

2,554,354

UNITED STATES PATENT OFFICE 2,554,354

MAGNETIC RECORDING AND REPRODUCING

Alfred L. W. Williams and Semi Joseph Begun, Cleveland Heights, Ohio, assignors to The Brush Development Company, Cleveland, Ohio, a corporation of Ohio Application July 27, 1944, Serial No. 546,808

1 Claim. (Cl. 179—100.2)

This invention relates to magnetic recording and reproducing systems and more particularly to such systems of the type using a reelable thin flexible magnetic record track filament held in level-wound coiled form on revolvably mounted reels and impelled from one reel to the other for recording or reproducing magnetic signals by magnetic flux interlinkage between a magnetic signal transducer head and an element of the record track filament moving past the pole piece gap of the transducer head.

Among the objects of the invention is a novel reelable, thin, flexible magnetic record track filament for such recording systems and a novel combination of such novel reelable magnetic record track filament material with a transducer head designed for cooperation therewith.

The foregoing and other objects of the invention will be best understood from the following description of exemplifications thereof, reference being had to the accompanying drawings wherein Fig. 1 is a diagrammatic side view of a magnetic recording device exemplifying the invention;

Figures 3, 4, 5, 6, 7, 8:
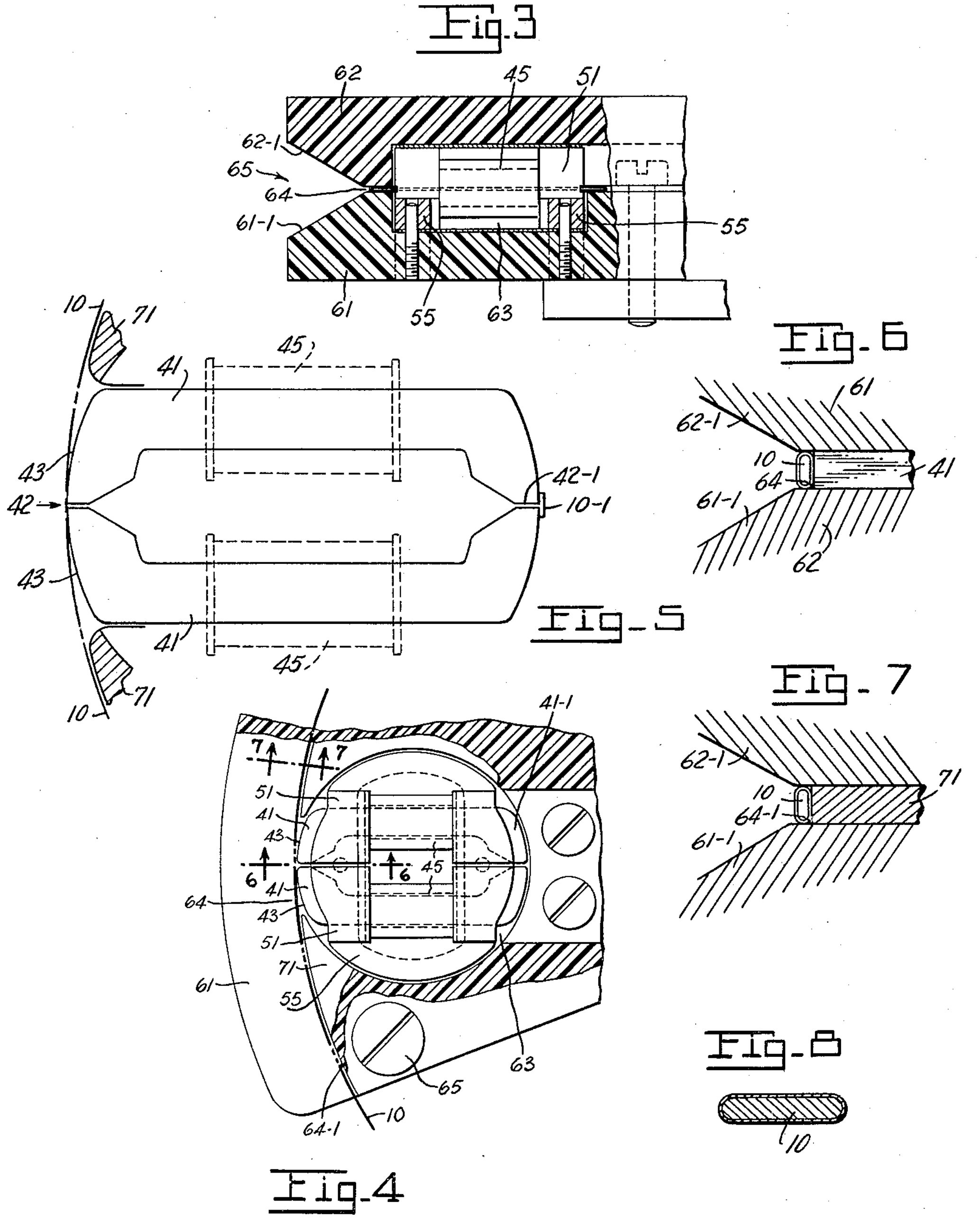
Fig. 3 is an enlarged partly cross-sectional view of the magnetic transducer head of Figs. 1 and 2.
Fig. 4 is a plan view of a part of the magnetic transducer head of Fig. 3 with parts broken away.
Fig. 5 is an enlarged detailed view similar to Fig. 4 of the relationship of the magnetic record filament to the pole pieces of the magnetic transducer head and to the filament guide structure.

Figs. 6 and 7 are enlarged detail views similar to Fig. 3 along the lines 6—6 and 7—7, respectively, of Fig. 4 showing the alignment of the record track filament along the pole faces of the magnetic transducer head and along the guide surface of the transducer head guide channel; and Fig. 8 is an enlarged cross-sectional view of a magnetic record track filament exemplifying the invention.

It is well known that in magnetic recording systems in which electric signals are recorded on a magnetic recording medium and played therefrom, it is essential that the permanently magnetizable recording medium should exhibit a high coercive force and that it should be very thin. For this reason, all prior recording systems used as magnetic recording medium either have a very thin magnetic steel wire or a very thin steel tape of high coercive force. Because of its roundness, a great length of thin steel wire can be stored on a small reel, it was used in all applications where a long recording period was required. In order to be commercially satisfactory, the magnetic material of the recording medium has to be able to magnetically record and to reproduce the magnetically recorded signals with a signal-to-noise ratio of at least about 25 decibels, and in case of high quality recording systems, with a signal-to-noise ratio of the order of about 40 decibels, or more. The commercially available drawn or rolled thin magnetic steel wires or tapes have in most cases a coercive force of about 25 oersteds, although more recently there have been developed magnetic steel wires and tapes having a coercive force of the order of about 50 to 60 oersteds. In order to record with a satisfactory signal-to-noise ratio, the magnetic material of the recording medium must be highly uniform in its structure and it must have a smooth exterior surface. Alloys and materials of high coercive force which are used for making the commercially available thin magnetic recording wires or tapes are very hard and difficult to draw and roll, and most of them require careful heat treatment. Since only a thin layer of the magnetic material of such available magnetic recording media is required for carrying on the magnetic recording process and it is desirable to confine the magnetic recording process to a very thin magnetic record layer, the balance of the expensive magnetic recording material is objectionable and wasted. For this reason, the idea of providing a magnetic recording medium by plating a non-magnetic wire with a thin layer of magnetic material has been advanced again and again following the first suggestion of such electroplated magnetic recording wire given in the Pederson Patent No. 836,339, filed in 1901.

When a thin, reelable magnetic steel wire is used in a magnetic recording reproducing system as a recording medium, the amplitude of the playback voltage at high frequency signals depends on the position of the wire relatively to the pole faces of the magnetic transducer head. This is due to the fact that, in recording a high frequency signal on such wire, the magnetic change in the wire is confined to a relatively small area region of the wire on the side which is in positive engagement with the pole faces of the magnetic recording head with which the recording is carried on, a higher reproducing level being obtained from the side of the wire which was in good engagement with the pole faces of the recording head than from the other side of the wire. For this reason, high quality magnetic recording-reproducing systems resorted to flat tapes as a recording medium, although, as stated before, thin magnetic wire is a much more desirable recording medium because a great length of it can be stored on a small reel. As distinguished from tape which does not twist during a reeling operation, it is practically impossible to prevent twisting of the wire heretofore used as a reelable recording medium. The variations of the pickup level caused by differences in the position of the wire surface relatively to the pole faces of the magnetic head, resulted in distortion of the output.

When using an electroplated magnetic recording medium in the form of a thin flexible wire of a non-magnetic material having an electroplated layer united to its exterior, the magnetic change effected by the recording process in the recording medium is confined to a relatively small area of the electroplated magnetic layer which is in positive engagement with the pole pieces of the magnetic recording head and it is essential to prevent twisting of the reelable electroplated recording medium when it is moved past the record transducing head, as otherwise the variations of the pick-up level caused by differences in the position of the surface of the electroplated magnetic layer relatively to the pole faces of the magnetic transducer head would result in great distortion of the reproducing output.

According to the invention, the foregoing difficulties are eliminated by the provision of a novel magnetic record track filament suitable for level winding and storing in compact form on reels which has all the advantages of the best prior thin wire recording media but without their deficiencies, the novel magnetic record track filament being formed of an elongated flat thin and flexible core of a drawn non-magnetic ductile metal and a thin magnetic layer of the order of one half thousandth of an inch united to at least one flat side of the core by electrodeposition process, the filamentary core and magnetic layer united thereto having such cross-sectional configuration as to permit its flexing in the direction of its flat side to the extent required during a reeling operation without materially altering its magnetic characteristics and as to cause the record track filament to align itself with its flat sides in a general direction perpendicular to the plane of its convolutions when it is wound on a reel and to align itself with a flat side into operative engagement with the pole faces of a magnetic transducer head when it is moved under tension in engagement therewith during a recording or reproducing process.

In its broader scope the present invention provides a novel magnetic record track filament suitable for level winding and storing on reels, which has all the advantages of the best prior thin wire recording medium, but without its deficiencies, and which is formed by providing thin flexible filaments with at least one flat side and such cross-sectional configuration as to permit its flexing in the direction of its flat side to the extent required during a reeling operation, without materially altering its magnetic characteristics, the flat cross-sectional configuration of the filament being of such character as to cause the filament to align itself with its flat sides in a general direction perpendicular to the plane of its convolutions when it is wound on a reel, and to align itself with its flat sides into operative engagement with the pole faces of a magnetic transducer head when it is moved under tension in engagement therewith during a recording or reproducing process.

Another phase of the invention involves the formation of such coated reelable magnetic material by applying the magnetic coating to a circular drawn wire which forms the core material, and then flattening the coated circular wire to give it the desired flat cross-sectional configuration.

Figure 1:
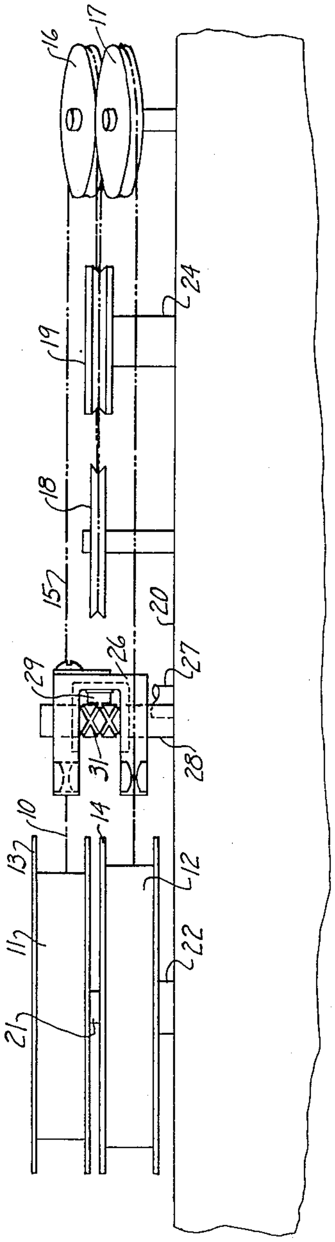
Figure 2:
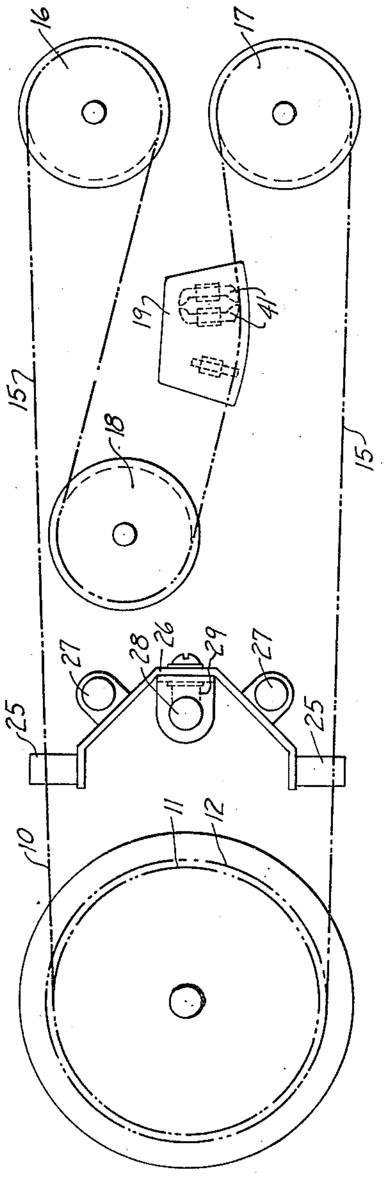
Fig. 2 is a plan view of the device of Fig. 1.

In Figs. 1 and 2 is shown a form of magnetic recording and reproducing device utilizing as a recording medium a thin flexible magnetic record track filament 10 which is stored in the form of two coils 11, 12 on two reels 13, 14, an intermediate filament portion 15 extending between the two coils being looped over guide means shown in the form of rollers 16, 17, 18 past a magnetic transducer head 19.

The two reels 13, 14 are indicated as revolvably mounted on two concentric shaft elements 21, 22 forming part of a motion-transmitting reel interconnection between the two reels 13, 14 so designed that when a length of record track is unwound from one reel, for instance, reel 13, the reel interconnection causes the other reel 14 to rotate at such speed correlated to the diameters of the two coils as to maintain the intermediate filament portion 15 under tension, while reeling substantially the entire long coiled filament 10 from reel 13 on reel 14 or vice versa.

The motion transmitting interconnection between the two reels is not part of the present invention. It may be formed by any suitable mechanism, for instance, of the type described in the application Serial No. 524,479, filed February 29, 1944, now abandoned, by S. J. Begun, in connection with Figs. 8 and 11. The concentric shaft elements of the two reels 13, 14, the shafts of the rollers 16, 17 and the other elements of the reel drive mechanism are all housed inside a casing having an exposed wall 23.

The magnetic head is shown mounted and held positioned on a suitable bracket 24 extending from the mounting wall 23. The reeling mechanism shown is also provided with level wind means including two fingers 25, carried by arms of a mounting bracket 26 which is guided in reciprocatory motion in a direction parallel to the reel axis by two guide posts 27 engaging suitable holes formed in the bracket extensions.

The central portion of the bracket 26 has a frame member provided with two arms riding on a shaft 28 projecting above the housing wall 23, a key member 29 suitably held in the frame member of the bracket 26 engaging an endless cross thread portion 31 of the shaft 28 so that the rotation of the shaft 28 shall impart to the bracket 26 and its level wind fingers 25 a reciprocatory motion of an amplitude and rate correlated to the height of the reels 12, 13 and to the speed with which the reeling operation is performed for assuring substantially level winding of successive layers of the filament 10 when it is reeled from either one of the reels on the other.

The mechanism for reeling the filament 10 and its features are not a part of the present invention, it being merely necessary to suitably drive one of the rollers, such as roller 16, with a reversible drive for impelling the filament portion 15 in one direction or the other.

The magnetic transducer head 19 is of a special construction, one form of which is shown in Figs. 3 to 7. The magnetic transducer head has two thin pole pieces 41 of highly permeable magnetic sheet material, such as Permalloy or Mumetal, aligned in a plane on the opposite sides of a very narrow magnetic gap 42 of the order of one thousandths of an inch wide extending for a relatively short distance inwardly from two narrow elongated pole faces 43 formed by the aligned outer edge surfaces of the pole pieces bordering the small gap 42 on the opposite sides thereof.

The edges of the pole pieces 41 are curved so as to provide a convex surface extending on both sides of the gap region in such manner that the pole faces maintain tangential engagement with the longitudinal elements of the moving filament 10 impelled past the pole faces. Each pole piece 41 is surrounded by windings of a coil 45 and each pole piece with its coil is so arranged that it forms one balanced half of a substantially closed magnetic circuit including two like gaps.

In other words, each pole piece 41 and its surrounding coil 45 is so arranged as a part of a closed magnetic circuit and so correlated to each other that its two core sections and windings are electromagnetically substantially alike and substantially symmetrical with respect to their gap portions for assuring that an external magnetic flux field, such as a stray field, traversing the two core and winding sections either in their axial directions or in directions tranverse thereto will induce in the interconnected windings voltages substantially opposite in phase and magnitude.

The windings of the two pole pieces are connected so that when signal current is sent therethrough, the pole faces 43 will impress or focus in successive longitudinal elements of the recording filament 10 engaging its pole faces corresponding magnetic flux which forms in the magnetic filament 10 a succession of elemental magnets or magnetic waves corresponding to the signal current. In the reproducing process, the coercive magneto-motive forces of the succession of elemental magnets or magnet waves represented by the filament 10, will, on passing along the pole faces, force through the pole pieces corresponding magnetic flux waves which induce in their surrounding windings voltages corresponding to the recorded signals which voltages are utilized for reproducing the recorded signal.

In the transducer head arrangement shown in Figs. 3 and 4, the coil spool structure 51 of each of the pole pieces is utilized to form a firm support for its thin pole piece 41. This is particularly important if highly permeable magnetic material, such as Permalloy or Mumetal, is used for the core structure of the pole pieces.

Each spool member 51 has a recess providing an elongated flat space within which the flat pole piece is firmly retained and protected while the coil is wound on the spool member 51.

There are available a number of synthetic resin materials which do not undergo material dimensional variations under changing temperature and humidity conditions, and such moldable synthetic resin materials may be used for molding the two spool members.

A recording-reproducing head of the type shown in Figs. 3 and 4 may be manufactured on a mass production basis with a high degree of uniformity by arranging them so that the two pole pieces may be united to a common mounting member in a position in which their critical gap region is maintained in a uniform definitely set condition.

In the arrangement shown in Figs. 3 and 4, one-half of the spool, for example, the lower spool half, as shown, is made shorter than the upper spool half, and the lower flat sides of the spool ends of each pole piece unit are united to a common mounting member shown in the form of a ring-like member 55. This makes it possible to align the two pole pieces with their proper gap spacing adjacent to each other and hold them aligned and united to a common stable mounting member which protects them and keeps them in an undisturbed stable condition during a substantial operating life.

The two pole piece units may be united in their properly aligned critical gap spacing position to the common mounting member 55 by a thin layer of a suitable cement having a high curing temperature. The mounting ring 55 may be made of a metal or suitable molded synthetic resin material formed of a material which is stable against humidity and temperature variations, such as resin-impregnated, fibrous or fabric material.

With this arrangement, the two pole pieces united to the common mounting member 55 form a self-supporting double-pole-piece unit which maintains all critical elements of the transducer structure in their critically aligned stable operating conditions.

In the arrangement shown, each core section is formed of a single pole piece, but it is understood that each core section or pole piece may be formed of two halves cut in their middle so as to make it possible to insert the two halves of each pole piece into a spool body on which the coil has been previously wound. Each core section and its surrounding winding section is electromagnetically substantially alike and they form two electromagnetically balanced structures which are substantially symmetric with respect to their gaps sections and are so arranged and correlated to each other that an external flux field traversing the two winding sections either in their axial direction or in a direction transverse thereto will induce in the interconnected windings voltages which are substantially opposite in phase and magnitude so that they cancel, while they are very effective and efficient in reproducing signals recorded on a magnetic track moving past the pole face region 43.

To secure perfect balance, the opposite gap 42—1 may be bridged by a magnetic element 10—1 proportioned so as to be equivalent in its effect to the magnetic record track element bridging the effective gap region 43 along which the record track 10 is impelled during the recording and reproducing process.

The double-pole-piece unit is arranged to be held within a substantially rigid supporting structure shown formed by two walls 61, 62 held suitably clamped to each other as by screws 65. The two wall members are provided in their interior with a cavity space 63 within which the assembled double-pole-piece bobbin unit is firmly held in its operative position so as to expose the pole faces 43 to portions of a convexly curved channel track 64 extending along the deepest portion of an outwardly opening guide channel 65 formed by the two wall members 61, 62 on the side extending in front of the two pole faces 43. The side walls of the guide channel 65 are formed by two outwardly tapering guide surfaces 61—1, 62—1 extending outwardly from the narrow channel track 64 constituting the deepest part of the guide channel. The elongated narrow channel track 64 has a width of the order of the width of the record track filament 10 and is so designed as to serve as a positive elongated guide surface which engagingly supports and guides a substantial length of the recording filament 10 as it moves towards and away from the region of the pole faces 43.

The forwardly projecting end portions of the pole pieces are firmly clamped in position by overlying wall portions of the two wall members 61, 62 bordering the channel track 64 in the manner indicated in Fig. 3. The rearwardly projecting end portions 41—1 of the pole piece are likewise held clamped by the overlying wall portions of the two wall members 61, 62. The surface of the channel track 64 may be formed by the edge surface of a sheet member 71 of substantially the same thickness as the pole pieces and placed between the two wall members so as to be aligned with the plane of the pole pieces when the double-pole-piece unit is clamped in position between the two wall members.

Another magnetic core may be held mounted within a second cavity space between the two wall members 61, 62 so that a magnetic field from each core is produced in the guide channel track 64 along which the magnetic record track filament moves past the transducer head; one magnetic core serving to obliterate previously recorded signals, and the other core serving to make new magnetic records; one of them serving also to play back the recorded signals. The recording head itself is not part of the present invention, but it is further described and claimed in the application of S. J. Begun, Serial No. 688,738, filed August 6, 1946, now Patent No. 2,513,617, July 4, 1950.

According to the invention, the cross section of the magnetic recording filament 10 is made not circular as in ordinary wires, but it is provided with a flat cross-section as indicated in an exaggerated manner in Fig. 8. The thickness of the pole pieces 41 may be made substantially equal to the greatest cross-sectional dimensions of the filament in the manner indicated in Fig. 6, portions of the side walls 61, 62 bordering the pole pieces serving to guide the filament 10 in its flatly aligned position along the pole faces 43.

Fig. 7 shows the corresponding portion of the guide channel track 64 formed along the edge surface of the spacer sheet 71 which is held clamped between the two wall members 61, 62 of the transducer head. The level of the guide channel track 64 and the level of the pole faces 43 are so positioned relatively to each other in the region along which the moving record track filament 10 approaches and leaves the pole faces 43 that the pressure exerted by the tensioned filament 10 on the pole pieces shall be limited to prevent excessive wear of the pole pieces. Since it is important to assure positive engagement between the pole faces and the moving filament, the pole faces should be subjected to a certain amount of initial wear for wearing into the pole faces 43 a guide path for the moving filament 10.

Magnetic record track filaments 10 of the invention having a flat or oval cross section in the manner indicated may be readily made from drawn circular magnetic steel wire by subjecting such wire to one or a series of rollering operations between rollers arranged in a conventional way to flatten the circular wire. Magnetic steel wires of circular cross section having a thickness of .003 to .008 inch, when flattened so that one of the cross-sectional dimensions is only half or a third of the diameter of the circular wire, have been found to perform in a magnetic recording apparatus of the type herein described as effectively as the same wire of circular cross section, such flattened wire being sufficiently flexible in all directions and its magnetic characteristics being substantially unaffected by the forces exerted thereon in a direction of its flat surface as it is being subjected to reciprocating forces during the level winding operation.

According to the invention, a much superior magnetic filamentary recording material of flat cross-section is obtained by applying to a flat filamentary core of substantially non-magnetic ductile metal, such as Phosphor bronze, a layer of permanently magnetic material having high coercive forces. Such layers may be readily formed by plating the non-magnetic core with a magnetic material. Such filaments having a flat non-magnetic core and a plated coating of magnetic material may be readily made at a fraction of the cost required to make satisfactory magnetic thin recording filaments of round steel wire having a high coercive force.

Thus, a thin layer of about one-half mil of cobalt may be plated on a flat filament of Phosphor bronze or other copper alloys with a quick plating process and a flat filament with such plated thin coating exhibits a coercive force of about 70 oersteds and a remanence of about 10,000 gauss. When using a plating solution of cobalt chloride having a pH value of 3 and plating with a current density of 80 amperes per square foot, plating area at room temperature, it requires only about seven minutes to plate on a flat thin non-magnetic tape of Phosphor bronze, such magnetic layer of cobalt about one-half mil thick. Such plated flat magnetic tape filament is thus considerably superior to the best steel wires and can be made on a commercial basis at an economical price and such plated filaments of oval or flat cross section are much superior in performance than corresponding circular or flattened steel wires.

Such magnetic cobalt plating is very smooth and extremely adherent to the non-magnetic metal core and does not crack.

Plated filamentary magnetic material of the invention having a flat cross section may also be obtained by plating a layer of magnetic material on a circular wire and then flattening the plated wire by rolling it between rollers.

The features and principles underlying the invention described above in connection with specific exemplifications, will suggest to those skilled in the art many other modifications thereof. It is accordingly desired that the appended claim shall not be limited to the specific details shown and described in connection with exemplifications thereof.

We claim:

A long filamentary permanently magnetizable record wire for use in a magnetic recorder-reproducer device wherein the record wire travels from one spool to another spool across an electromagnetic transducer head having two confronting pole portions in engagement with said wire and defining between said two pole portions a non-magnetic gap and wherein level-wind mechanism imparts to portions of said wire lying between said two reels forces generally parallel to the axial direction of said reels and transverse to the width of said wire for causing said wire to be level-wound on the take-up reel, said wire having at least one substantially flat side extending generally parallel to the axis of said reels as said wire lies wound on said reels, said substantially flat side of said wire being the side of the wire which engages the pole portions of the transducer head so that each successive incremental portions of the wire always has the same relative position with respect to the pole portions during a reproducing operation that it had during a recording operation, the width-to-thickness ratio of said wire being between from substantially 2:1 to substantially 3:1 to make it sufficiently flexible in all directions that bending forces incident to the level-winding action and to the winding of the wire on the reels are insufficient to change the permanent magnetic characteristics of said wire.

ALFRED L. W. WILLIAMS.
SEMI JOSEPH BEGUN.

REFERENCES CITED

The following references are of record in the file of this patent:

UNITED STATES PATENTS

| Number | Name | Date |
|---|---|---|
| 773,893 | Ries | Nov. 1, 1904 |
| 1,971,028 | Bothe | Aug. 21, 1934 |
| 2,080,812 | Fairbanks | May 18, 1937 |
| 2,089,287 | Malloy | Aug. 10, 1937 |
| 2,251,322 | Buhrendorf | Aug. 5, 1941 |
| 2,265,246 | Ott | Dec. 2, 1941 |
| 2,272,821 | Roys | Feb. 10, 1942 |
| 2,351,003 | Camras | June 13, 1944 |
| 2,351,006 | Camras | June 13, 1944 |

FOREIGN PATENTS

| Number | Country | Date |
|---|---|---|
| 7,292 | Great Britain | Mar. 28, 1903 |
| 119,071 | Japan | Feb. 17, 1937 |

OTHER REFERENCES

Investigation of Magnetic Tape Recorders, Selby, Electronics, May 1944, page 133 only.

Experimental Consideration . . . New Recording Method, K. Nagai, Nippon Electrical Communication Engineering, page 445 only.